3,182,054
BENZODIAZEPINE COMPOUNDS
Leo Henryk Sternbach, Upper Montclair, N.J., and Gabriel Saucy, Riehen, Switzerland, assignors to Hoffmann-La Roche Inc., Nutley, N.J., a corporation of New Jersey
No Drawing. Filed Mar. 23, 1962, Ser. No. 182,130
Claims priority, application Switzerland, Dec. 2, 1960, 13,490/60, 13,492/60, 13,493/60, 13,494/60, 13,495/60
6 Claims. (Cl. 260—239)

This application is a continuation-in-part of copending applications Serial No. 2,605, filed January 15, 1960, and now abandoned, and 103,727, filed April 18, 1961.

This invention relates to 2-amino-trifluoromethylbenzophenones as well as precursors and derivatives thereof. More particularly, the invention relates to compounds of the structural formula (I)
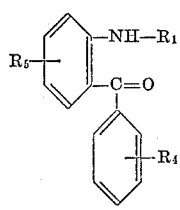

wherein $R_1$ is chosen from the group consisting of hydrogen and lower alkyl, $R_4$ and $R_5$ are chosen from the group consisting of hydrogen, halogen, nitro, amino and trifluoromethyl; and at least one of $R_4$ and $R_5$ is trifluoromethyl.

The invention relates also to the compounds which are intermediates for these amino-benzophenones and to the compounds which can be produced from them.

2-amino-trifluoromethylbenzophenones are especially valuable for the synthesis of benzodiazepine compounds, e.g., compounds represented by one of the following formulas (II)
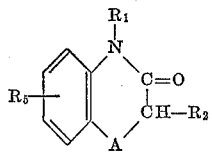

(III)
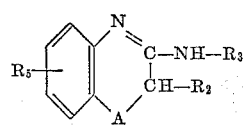

wherein A represents a carbon nitrogen grouping which completes the seven-membered diazepine ring and which is selected from the group consisting of

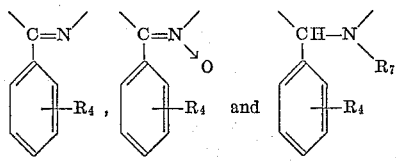

$R_1$, $R_2$, $R_3$ and $R_7$ each represent a member of the group consisting of hydrogen and lower alkyl, $R_4$ and $R_5$ are chosen from the group consisting of hydrogen, halogen, nitro, amino and trifluoromethyl; and at least one of $R_4$ and $R_5$ is trifluoromethyl.

These compounds (i.e., those of Formulas II and III above) are valuable therapeutic agents. In addition to the compounds within the scope of Formulas II and III above there are also encompassed in the invention the pharmaceutically acceptable salts of said compounds. Certain compounds of the above formulas form pharmaceutically acceptable acid addition salts and/or pharmaceutically acceptable quaternary ammonium salts. Thus, the basic benzodiazepine compounds (i.e., those of Formulas II and III above except those illustrated by Formula VI below) of the invention form acid addition salts by reaction with inorganic and organic acids such as mineral acids, e.g., hydrohalic acids, for example by hydrochloric acid, hydrobromic acid and the like, nitric acid, sulfuric acid, phosphoric acid, etc. and acetic acid, methanesulfonic acid, succinic acid and the like. Also the compounds containing a tertiary amino nitrogen atom in the 4-position, i.e., the compounds of Formulas II and III wherein $R_7$ is lower alkyl, form pharmaceutically acceptable quaternary salts with conventional quaternizing agents such as lower alkyl halides and the like.

The compounds formed during the synthesis of the trifluoromethyl-benzophenone and those formed during the preparation of the benzodiazepines are novel compounds which, except as pointed out below, are within the scope of this invention.

The 2-amino-trifluoromethylbenzophenone compounds of the invention can be produced by a variety of methods, which are illustrated in detail in the examples to follow. One method involves the reaction of an anthranilic acid derivative with acetic anhydride to produce a 2-methyl-3,1-benzoxazin-4-one. By reacting this latter compound with a phenyl Grignard agent and hydrolyzing the resulting crude product, the desired 2-amino-trifluoromethyl-benzophenone can be obtained. When an anthranilic acid starting material bearing a trifluoromethyl substituent is used, the ring bearing the 2-amino substituent in the benzophenone is substituted by a trifluoromethyl group. However, if the phenyl Grignard agent is substituted by a trifluoromethyl group, then the benzophenone benzene ring which does not contain the 2-amino group will be trifluoromethyl substituted. Also a 3,1-benzoxazin-4-one, derived from a trifluoromethyl-substituted anthranilic acid, can be reacted with a trifluoromethyl-substituted phenyl Grignard agent to yield a 2-amino-bis(trifluoromethyl)benzophenone.

An alternative method of obtaining the 2-amino-trifluoromethylbenzophenone compounds is to react a 2-chlorobenzonitrile with a phenyl Grignard agent, e.g., with a phenyl magnesium halide or phenyl lithium. This reaction produces a 2-chlorobenzophenone imine which, upon acid hydrolysis, yields a 2-chlorobenzophenone, said compound yielding the desired 2-aminobenzophenone upon ammonolysis. If the 2-chlorobenzonitrile starting material has a trifluoromethyl substituent then the benzene ring containing the 2-amino substituent in the benzophenone end product will be trifluoromethyl substituted.

The 2-amino-trifluoromethylbenzophenones can be converted with glycine or an ester thereof to form trifluoromethyl - 5 - phenyl - 3H - 1,4 - benzodiazepin - 2(1H)-ones which have the structural formula (IV)
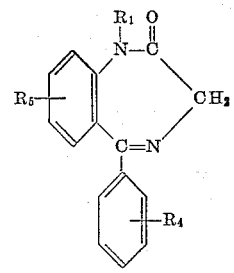

wherein $R_1$, $R_4$ and $R_5$ have the same meaning as above.

If, instead of glycine or its ester, a longer chain α-amino acid or ester thereof is used, for example α-alanine or its ester, then a substituent can be introduced into the 3-position, e.g.

(V) 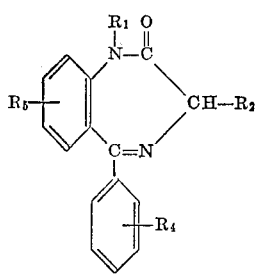

wherein $R_1$, $R_2$, $R_4$ and $R_5$ have the same meaning as above.

Alternatively, 2 - amino - trifluoromethylbenzophenones can be treated with hydroxylamine hydrochloride to form corresponding 2 - amino - trifluoromethylbenzophenone oximes. Reaction of the oxime with chloroacetyl chloride in acetic acid produces the chloroacetamino derivative which cyclizes to form a 2-chloromethyl-4-phenylquinazoline 3-oxide bearing a trifluoromethyl substituent. The last named compound can then be reacted with an alkali metal hydroxide or alkaline earth metal hydroxide, preferably in an inert organic solvent such as alcohol, acetone, dioxane, and the like, to enlarge the ring and produce a 5-phenyl-3H-1,4-benzodiazepin-2(1H)-one 4-oxide bearing a trifluoromethyl substituent and having the structural formula (VI) 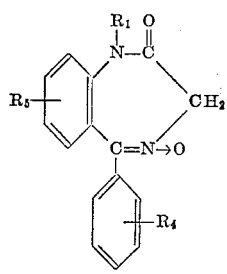

wherein $R_1$, $R_4$ and $R_5$ have the same meaning as above, or it can be reacted with ammonia or lower alkylamine to yield a 2-amino-5-phenyl-3H-1,4-benzodiazepine 4-oxide or a 2-lower alkylamino-5-phenyl-3H-1,4-benzodiazepine 4-oxide, respectively. The latter two products can be represented by the structural formula (VII) 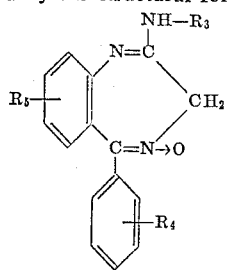

wherein $R_3$, $R_4$ and $R_5$ have the same meaning as above.

The compounds of Formula VI can be converted to compounds of Formula IV by treatment with phosphorus trichloride or by catalytic hydrogenation, for example in the presence of Raney nickel. By the same procedures, compounds of Formula VII can be converted into compounds represented by the formula (VIII) 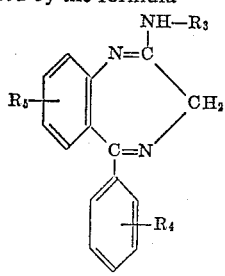

wherein $R_3$, $R_4$ and $R_5$ have the same meaning as above,

When 5-phenyl-3H-1,4-benzodiazepine compounds, i.e., compounds of Formulas IV, V and VIII above, are reduced with hydrogen in the presence of a platinum catalyst, the corresponding 5-phenyl-4,5-dihydro-3H-1,4-benzodiazepines are obtained, i.e., those compounds of Formulas II and III wherein A represents

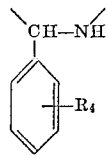

are produced.

The compounds corresponding to Formula II (i.e., Formulas IV, V and VI) wherein $R_1$ is hydrogen and those corresponding to Formulas II and II, wherein $R_7$ is hydrogen can be modified so that $R_1$ and/or $R_7$ are lower alkyl by a variety of methods. Compounds of Formula II wherein $R_1$ is lower alkyl can be obtained by reacting corresponding compounds wherein $R_1$ is hydrogen with a diazo-alkane, alkyl sulfate or alkyl halide, in a medium such as ether, benzene, alcohol or dioxane. Further, the compounds of Formula II wherein $R_1$ is lower alkyl can be obtained directly from 2-(N-lower alkyl)-aminobenzophenones. Compounds of Formula II wherein $R_1$ is lower alkyl and $R_7$ is hydrogen can be converted into corresponding compounds wherein $R_7$ lower alkyl by reaction with a lower alkyl halide. By alkylation of compounds of Formula II wherein $R_1$ and $R_7$ are both hydrogen and by altering the conditions of the reaction, any one of four reaction products can be obtained. More explicitly, the four reaction products which can be obtained are those wherein the 1-position hydrogen alone is replaced, those where the 4-position hydrogen alone is replaced, those where both the 1- and 4-position hydrogens are simultaneously replaced and those where the 4-position nitrogen is quaternized. Thus, treatment of a solution of a compound of Formula II, wherein A is

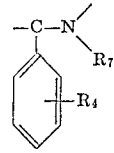

and both $R_1$ and $R_7$ are hydrogen, with an excess of lower alkyl halide gives the corresponding derivative wherein $R_7$ is converted to lower alkyl, while prolonged heating results in the quaternization of the 4-position nitrogen atom. On the other hand, by using sodium methoxide, sodium hydride or the like, to form the sodio derivative of the 1-position nitrogen atom, and reacting this with an equivalent amount of lower alkyl halide, the corresponding compound of Formula II wherein only the 1-position nitrogen atom is substituted is obtained. Using an excess of lower alkyl halide and prolonged heating with a sodio derivative of a compound of Formula II wherein either both $R_1$ and $R_7$ are hydrogen, or wherein $R_1$ alone is hydrogen, results in the 1,4-di-lower alkyl compound wherein both $R_1$ and $R_7$ are lower alkyl. Further, as discussed above, this 1,4-disubstituted compound can also be obtained by heating a compound wherein $R_1$ is lower alkyl and $R_7$ is hydrogen with an excess of lower alkyl halide.

The direct synthesis of the benzodiazepinones by reaction of the 2-amino-trifluoromethylbenzophenones with an α-amino acid or ester thereof forms an important feature of the invention. According to this method the ketone is heated with an α-amino acid or ester thereof such as glycine or a glycine ester; for example a glycine lower alkyl ester such as glycine ethyl ester, α-alanine or an α-alanine lower alkyl ester, and the like. The reaction is preferably effected in a solvent such as pyridine, dimethylformamide, and the like. It is also preferable to have an ion of a strong acid present in the reaction mixture and therefore it is convenient to use reagents in the form of the salt of a strong organic or inorganic acid, e.g., glycine hydrochloride, glycine ethyl ester hydrochloride, α-alanine hydrochloride, α-alanine methyl ester hydrochloride or part of the pyridine as pyridine hydrochloride.

Benzodiazepin-one compounds corresponding to Formula IV above can also be produced by reacting a 2-amino-trifluoromethylbenzophenone corresponding to Formula I above, with an α-halo-lower alkanoyl-halide, such as chloracetyl chloride, bromoacetyl bromide, α-bromopropionyl bromide and the like, to produce a 2-(α-halo-lower alkanoylamino)-trifluoromethylbenzophenone corresponding to the formula

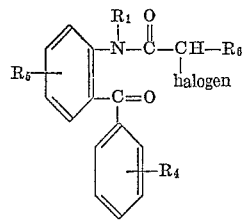

(IX)

wherein $R_1$, $R_4$ and $R_5$ have the same meaning as above, and $R_6$ is selected from the group consisting of hydrogen and lower alkyl.

The compounds corresponding to Formula IX can then be directly cyclized by reaction with ammonia to yield compounds corresponding to Formula IV above or they can be reacted with ammonia so that the halogen atom is replaced by the amino group yielding a 2-(α-amino-lower alkanoylamino)-trifluoromethylbenzophenone which then can be cyclized to a compound corresponding to Formula IV above. The 2-(α-amino-lower alkanoylamino)-trifluoromethylbenzophenones and the method of cyclizing them to compounds of Formula IV above are not a part of this invention but are disclosed herein in order that the present disclosure may be complete.

Any of the compounds of Formulas I–IX above can be treated with an agent which introduces a nitro group into a position on one of the benzene rings thereof. Further, any nitro group present in any of the compounds of Formulas I–IX above can be reduced to an amino group.

The benzodiazepin compounds corresponding to Formulas II and III above, which are inclusive of the compounds corresponding to Formulas IV through VIII above, are valuable as therapeutic agents. They are useful as sedatives and anti-convulsants and can be used as tranquilizers and muscle relaxants. These compounds can be administered parenterally or orally in therapeutic dosage in solid or liquid dosage forms such as tablets, capsules, suspensions, elixirs and the like. The compounds which are basic in character can be administered in the form of the medicinally acceptable acid addition salts and those with a tertiary nitrogen atom in the 4-position can be administered in the form of their quaternary ammonium salt.

The following examples are illustrative of the invention but not limitative thereof. All temperatures are in degrees centigrade.

*Example 1*

80 g. of sodium nitrite were added slowly with stirring to 460 ml. of concentrated sulfuric acid. After heating to 70°, a clear solution was obtained. This solution was cooled and 200 g. of 2-chloro-5-trifluoromethylaniline were slowly added at a temperature between 10 and 20°. The reaction mixture was stirred for one hour at 20° and then poured onto a mixture of 200 g. of sodium chloride and 1.6 kg. of ice. Excess sodium chloride was filtered off. A solution of 280 g. of zinc chloride in 300 ml. of water was added to the filtrate whereupon a zinc chloride double salt of the corresponding diazonium compound precipitated. After standing overnight at 0°, the double salt was filtered off and washed with a cold saturated salt solution.

To a solution of 120 g. of sodium cyanide and 72 g. of cuprous cyanide in 300 ml. of water were added with stirring and cooling with ice, 291 g. of the wet zinc chloride double salt. After the addition of 24 g. of sodium carbonate, the mixture was first stirred for one hour at 20° and then at 70° for an additional ½ hour. The reaction mixture was cooled and extracted with ether to obtain crude 2-chloro-5-trifluoromethylbenzonitrile. The product was purified by steam distillation and crystallization of the organic part of the distillate from hexane to give the pure compound, M.P. 39–40°.

*Example 2*

To a solution of phenyl magnesium bromide, prepared from 9.5 g. of magnesium, 58.5 g. of bromobenzene and 500 ml. of anhydrous ether, was added with stirring a solution of 39 g. of 2-chloro-5-trifluoromethylbenzonitrile in 200 ml. of benzene. 400 ml. of solvent were distilled off and the reaction mixture was then refluxed for 16 hours. The Grignard complex was decomposed with 40 g. of ammonium chloride and 200 g. of ice. The mixture was then extracted with benzene. 2-chloro-5-trifluoromethylbenzophenone imine hydrochloride was precipitated from the benzene solution by the addition of 40 ml. of concentrated hydrochloric acid. The product was filtered off, washed with benzene and dried in vacuo, M.P. 248–251°, and upon further purification melted at 250–262°.

*Example 3*

60 g. of 2-chloro-5-trifluoromethylbenzophenone imine hydrocholride were refluxed overnight with a mixture of 300 ml. of toluene and 300 ml. of 25% sulfuric acid while stirring. The toluene layer was separated, washed with water, dried, concentrated in vacuo and the residue crystallized from hexane to yield pure 2-chloro-5-trifluoromethylbenzophenone, M.P. 39–40° (corr.).

*Example 4*

50 g. of 2-chloro-5-trifluoromethylbenzophenone and 500 ml. of concentrated aqueous ammonia were reacted in a closed vessel for 10 hours at 140° in the presence of 10 g. of cuprous chloride catalyst. The reaction product was extracted with ether. The ether extract was concentrated in vacuo, the residue dissolved in hexane and purified by chromatography using a 10 fold amount of neutral alumina (Brockmann activity state II). Elution with a hexane-ether mixture (1:1) and evaporation of the solvent gave 2-amino-5-trifluoromethylbenzophenone which was recrystallized from hexane to give yellow crystals, M.P. 81–82° (corr.).

*Example 5*

2 g. of 2-amino-5-trifluoromethylbenzophenone in 50 ml. of pyridine were refluxed for 1½ hours with 2.0 g. of glycine ethyl ester hydrochloride. After that, another 1.0 g. of glycine ethyl ester hydrochloride in 2 ml. of pyridine were added. Then 3 ml. of the solvent were distilled off. Refluxing was continued for an additional 2½ hours. The reaction mixture was extracted with benezene, the organic layer was washed with water and dried over sodium sulfate. After evaporation of the solvent, a crude oil was obtained which was dissolved in hexane. After 2 days at 0°, the precipitated pure crystalline 7-trifluoromethyl-5-phenyl-3H-1,4-benzodiazepin-2(1H)-one was filtered off. It melted at 198–199°.

By reducing 7-trifluoromethyl-5-phenyl-3H-1,4-benzodiazepin-2(1H)-one with one molar proportion of hydrogen in glacial acetic acid at room temperature and atmospheric pressure in the presence of platinum oxide catalyst, 7-trifluoromethyl-5-phenyl-4,5-dihydro-3H-1,4 - benzodiazepin-2(1H)-one is obtained.

By using α-alanine methyl ester hydrochloride instead of the glycine ethyl ester hydrochloride, 7-trifluoromethyl- 3-methyl-5-phenyl-3H-1,4-benzodiazepin-2(1H)-one is obtained.

Example 6

13.3 g. of 2-amino-5-trifluoromethylbenzophenone in 60 ml. of ethanol were refluxed for 24 hours with 6 g. of hydroxylamine hydrochloride. The reaction mixture was adjusted to about pH 6 by the addition of a solution of 12 g. of sodium acetate in 100 ml. of water. The mixture was then extracted with ether to yield an oil which, after repeated crystallization from a mixture of ether and hexane, gave 2-amino-5-trifluoromethylbenzophenone oxime melting at 175–177°, which upon further crystallization melted at 182–183° (corr.).

Example 7

2.8 g. of the 2-amino-5-trifluoromethylbenzophenone oxime obtained above were dissolved in 15 ml. of acetic acid and, after addition of 1.5 ml. of chloroacetyl chloride, kept for one hour at 20°, then for two hours at 70°. The mixture was diluted with ether and washed with water. The ether solution was concentrated in vacuo and gave a solid residue which was crystallized from methylene chloride-ether to yield pure, yellow 2-chloromethyl-4-phenyl-6-trifluoromethylquinazoline 3-oxide, M.P. 149–150°.

Example 8

538 mg. of 2-chloromethyl-4-phenyl-6-trifluoromethylquinazoline 3-oxide were dissolved in 20 ml. of ethanol and, after the addition of 5 ml. of 3 N sodium hydroxide, the solution was kept for 4 hours at 25°. After acidification with 6 ml. of 3N hydrochloric acid, the reaction product was extracted with ether. The ether solution was concentrated in vacuo and the residue crystallized from benzene to yield purified 7-trifluoromethyl-5-phenyl-3H-1,4-benzodiazepin-2(1H)-one 4-oxide, M.P. 211–212°, which upon further crystallization melted at 217–218° (corr.).

Example 9

1.60 g. of 7-trifluoromethyl-5-phenyl-3H-1,4-benzodiazepin-2(1H)-one 4-oxide were dissolved in 60 ml. of benzene, containing 0.30 g. of sodium methoxide. After the addition of a solution of 0.50 ml. of dimethylsulfate in 20 ml. of benzene, the reaction mixture was refluxed for 1 hour, then cooled. The organic layer was separated, washed with water and dried over sodium sulfate. Evaporation of the solvent in vacuo yielded an amorphous crude, which was crystallized from ether-hexane to give pure 1-methyl-7-trifluoromethyl-5-phenyl-3H-1,4 - benzodiazepin-2(1H)-one 4-oxide, in the form of small prisms, M.P. 177–180°, which upon recrystallization melted at 184–186° (corr.).

1-methyl-8-trifluoromethyl-5-phenyl-3H-1,4 - benzodiazepin-2(1H)-one 4-oxide is obtained by the same procedure when 8-trifluoromethyl-5-phenyl-3H-1,4-benzodiazepin-2(1H)-one 4-oxide is substituted as starting material.

Example 10

1.0 g. of 1-methyl-7-trifluoromethyl-5-phenyl - 3H - 1,4-benzodiazepin-2(1H)-one 4-oxide were dissolved in 20 ml. of chloroform. After addition of 0.3 ml. of phosphorus trichloride, the solution was refluxed for ½ hour. The reaction mixture was diluted with ether and washed with sodium bicarbonate solution and water. After drying over sodium sulfate, the solvent was evaporated in vacuo to give 1-methyl-7-trifluoromethyl-5-phenyl-3H-1,4-benzodiazepin-2(1H)-one as the residue.

Example 11

0.3 g. of 1-methyl-7-trifluoromethyl-5-phenyl - 3H - 1,4-benzodiazepin-2(1H)-one 4-oxide was dissolved in 15 ml. of methanol and hydrogenated at room temperature and normal pressure using Raney nickel as a catalyst. After one molar proportion of hydrogen had been absorbed, the catalyst was filtered off, and the solvent was evaporated to obtain the same product as in Example 10.

Example 12

0.5 g. of 2-chloromethyl-4-phenyl - 6 - trifluoromethylquinazoline 3-oxide was treated with 10 ml. of a saturated solution of ammonia in methanol. The reaction mixture was left for 5 hours at room temperature, then diluted with ether and washed 3 times with water. The ether solution was separated and dried over sodium sulfate. The solvent was evaporated in vacuo and the residue was crystallized from benzene-hexane. The 7-trifluoromethyl-2-amino-5-phenyl-3H-1,4-benzodiazepine 4-oxide was obtained as white needles, M.P. 229–231°, which upon further crystallization melted at 240–242° (corr.).

Example 13

500 mg. of 2-chloromethyl-4-phenyl-6-trifluoromethylquinazoline 3-oxide were reacted for 5 hours at 25° with 10 ml. of a 40% solution of methylamine in methanol. The reaction mixture was diluted with water, then extracted with ether. The ether solution was concentrated in vacuo and the residual crude, 7-trifluoromethyl-2-methylamino-5-phenyl-3H - 1,4 - benzodiazepine 4 - oxide, was purified by crystallization from ether-hexane to yield colorless crystals melting at 257–258°, which upon recrystallization melted at 264–265°.

100 mg. of 7-trifluoromethyl-2-methylamino-5 - phenyl-3H-1,4-benzodiazepine 4-oxide, dissolved in 5 ml. of methanol, were treated with 3 ml. of 0.1 N hydrochloric acid at 25°. The reaction mixture was evaporated at 40° in vacuo and the residue was crystallized from methanol-ether to give the pure hydrochloride of 7-trifluoromethyl-2-methylamino-5-phenyl-3H-1,4-benzodiazepine 4-oxide in the form of white prisms, M.P. 222° (with dec.).

Example 14

75.9 g. of sodium nitrite were added slowly with stirring to 445 ml. of concentrated sulfuric acid at 0–10° C. After the addition was completed, the reaction mixture was allowed to stir without external cooling, whereupon the temperature rose to about 70° C. and the solution turned turbid. After cooling to 30° C., 206 g. of 2-nitro-4-trifluoromethyl-aniline were added in portions over a period of about 2 hours, the temperature being kept at 30 to 35° C. Stirring was continued for an additional 1½ hours at room temperature. Then, the reaction mixture was poured over 1.35 kg. of ice. A small amount of insoluble material was filtered off and the filtrate treated with 270 g. of zinc-chloride, dissolved in a small amount of water. After cooling for several hours to 0° C., the precipitated diazonium zinc chloride double salt was filtered off and washed with a small amount of saturated sodium chloride solution. To a cold solution of 147 g. of sodium cyanide and 89.5 g. of cuprous cyanide in 750 ml. of water, the wet diazonium compound described above was added in small portions. During the addition, the temperature was kept below 20° C. After addition of 30 g. of sodium bicarbonate, the reaction mixture was stirred at room temperature for 2 hours. Then, it was heated for half an hour on a steam bath to 70° C. After cooling, water and ether was added to the reaction mixture; then, it was acidified, filtered and the filtrate extracted with ether the usual way to give an oil, which was purified by distillation. The fractions between 85–110°/1–2 mm. Hg solidified and contain the 2-nitro-4-trifluoromethylbenzonitrile.

Example 15

100 g. of 2-nitro-4-trifluoromethylbenzonitrile were dissolved in 2.5 liters of methanol and hydrogenated at atmospheric pressure in the presence of 20 g. of wet Raney nickel catalyst. The reaction was continued until 3 molar proportions of hydrogen were absorbed. The catalyst was filtered off and the methanol solution was evaporated to dryness. The residue was crystallized from a mixture of ether and petroleum ether. The 4-trifluoromethylanthranilic acid amide formed colorless needles melting at 151–152°.

*Example 16*

68.5 g. of 4-trifluoromethylanthranilic acid amide were refluxed with 700 ml. of a 50% sulfuric acid solution for one hour, then poured onto ice. The precipitated reaction product was filtered off and washed with water. The 4-trifluoromethylanthranilic acid was crystallized from a mixture of ethanol and water and then melted at 175°.

*Example 17*

A solution of 23 g. of 4-trifluoromethylanthranilic acid in 150 ml. of acetic anhydride was refluxed for one hour. Then the solvent was removed by distillation under reduced pressure and the residue was crystallized from benzene-hexane to obtain 2-methyl-7-trifluoromethyl-4H-3,1-benzoxazin-4-one, M.P. 68–70°.

*Example 18*

A solution of phenylmagnesium bromide, prepared from 2.4 g. of magnesium, 15.2 g. of bromobenzene and 150 ml. of ether, was added to a solution of 18 g. of 2-methyl - 6 - trifluoromethyl-4H-3,1-benzoxazin-4-one in 100 ml. of benzene while stirring and cooling with ice. The Grignard reagent was added slowly over a period of one hour. After stirring for one additional hour at 5°, the reaction mixture was treated with ice and ammonium chloride. The crude reaction product was extracted with ether. The extract was concentrated in vacuo and the residue was refluxed for one hour with a mixture of 100 ml. of 3 N sodium hydroxide and 100 ml. of methanol. The reaction mixture was extracted with benzene. The benzene extract was concentrated in vacuo and the residual, crude 2-amino - 4 - trifluoromethylbenzophenone was dissolved in hexane and purified by chromatography using a 20 fold amount of neutral alumina (Brockmann activity state III). Elution with a mixture of hexane-ether (1:1) and evaporation yielded yellow 2-amino-4-trifluoromethylbenzophenone which was recrystallized from hexane, M.P. 55–56° (corr.).

*Example 19*

2 g. of 2-amino-4-trifluoromethylbenzophenone were reacted with 2.0 g. of glycine ethyl ester hydrochloride in pyridine precisely as described in Example 5. The crude reaction product was crystallized from ether-hexane to yield pure 8-trifluoromethyl-5-phenyl-3H-1,4-benzodiazopin-2(H)-one, M.P. 186–186.5°.

By following the procedure described in Examples 6, 7, 8, 12 and 13 but using 2-amino-4-trifluoromethylbenzophenone as the original starting material, 8-trifluoromethyl-5-phenyl-3H-1,4-benzodiazepin-2(1H)-one 4-oxide, 8-trifluoromethyl-2-amino-5-phenyl-3H-1,4-benzodiazepine 4-oxide and 8-trifluoromethyl-2-methylamino-5-phenyl-3H-1,4-benzodiazepine 4-oxide are obtained.

*Example 20*

A solution of o-trifluoromethyl phenyl magnesium bromide was prepared in the usual manner from 50.0 g. of o-bromo-benzotrifluoride, 5.55 g. of magnesium and 110 ml. of anhydrous ether. The Grignard reagent can also be prepared by reacting 39.7 g. of o-chlorobenzotrifluoride with 5.55 g. of magnesium in tetrahydrofurane. This solution was added with stirring at 20° C. over a period of 3 hours to a solution of 33.0 g. of 2-methyl-4H-3,1-benzoxazin-4-one in 300 ml. of methylene chloride. The resulting dark but clear solution was left at room temperature for 16 hours and was then poured over a mixture of 50 g. of ammonium chloride and 600 g. of crushed ice. Extraction with ether gave a crude reaction product which was directly hydrolyzed by refluxing for one hour in a mixture of 240 ml. of ethanol and 240 ml. of 3 N sodium hydroxide. After standing overnight, the reaction mixture was extracted with ether. The ether layer was washed with water and concentrated in vacuo yielding an oil. This was purified in two portions by chromatography on the 20-fold amount of neutral alumina (activity grade III; e.g., containing 6% of water). Elution with petroleum ether (60–70°) and a mixture of petroleum ether (60–70°) and ether (9:1) followed by crystallization from a mixture of ether and hexane yielded 2-amino-2'-trifluoromethylbenzophenone, melting at 94–96° (yellow prisms).

*Example 21*

To a solution of 5.0 g. of 2-amino-2'-trifluoromethylbenzophenone in 25 ml. of anhydrous ether, cooled to 0° C., 1.7 ml. of bromoacetylbromide was added with stirring; a precipitation occurred and the yellow color of the solution gradually faded. The suspension containing 2 - bromoacetamido-2'-trifluoromethylbenzophenone (not isolated) was stirred for half an hour at 0° C. and for two hours at room temperature. After that, 25 ml. of liquid ammonia was condensed into the flask, by introducing ammonia gas and using an efficient Dry Ice-acetone condenser. The resulting mixture was stirred and refluxed (B.P. of liquid ammonia) for 3 hours. After taking off the condenser, the ammonia was allowed to evaporate overnight. The reaction mixture was extracted with ether (the ether layers being washed 3 times with water) and yielded crude 2-amino-2'-(2-trifluoromethylbenzoyl)acetanilide. Recrystallization from a mixture of 15 ml. of benzene and 15 ml. of hexane gave the pure product, melting at 141–142° C. (colorless, rhombic plates).

*Example 22*

3.0 g. of 2-amino-2'-(2-trifluoromethylbenzoyl)acetanilide was heated in an open tube for 15 minutes to 200–205° C., using an oil bath. Water was given off. On cooling, a brown glass was obtained which, on crystallization from a mixture of methanol and ether, gave crude 5-(2 - trifluoromethylphenyl)-3H-1,4-benzodiazepin-2(1H)-one. The mother liquor was evaporated to dryness, dissolved in benzene and chromatographed on 60 g. of neutral alumina (activity grade III, e.g., containing 6% of water). Elution with benzene (300 ml.) gave a product which could be crystallized to give some starting material. Then, with a benzene-ether-(1:1)-mixture (400 ml.), a crude product could be eluted. This, on crystallization from ether-hexane, gave the pure 5 - (2-trifluoromethylphenyl) - 3H - 1,4 - benzodiazepin-2(1H)-one, melting at 187–188° (almost colorless prisms).

*Example 23*

A solution of m-trifluoromethyl-phenyl magnesium bromide prepared from 5.55 g. of magnesium, 50.0 g. of m-bromobenzotrifluoride and 110 ml. of anhydrous ether was added with stirring over a period of 3 hours at 20° C. to a solution of 33.0 g. of 2-methyl-4H-3,1-benzoxazin-4-one in 300 ml. of methylene chloride. After stirring at room temperature for an additional half hour, the reaction mixture was poured over a mixture of 50 g. of ammonium chloride and 500 g. of ice and allowed to stand overnight. The crude product obtained in the usual manner by extraction with ether and the evaporation of the solvent was hydrolyzed by refluxing for one hour with a mixture of 250 ml. of ethanol and 250 ml. of water. Upon addition of 200 ml. of 3 N sodium hydroxide, a yellow precipitate was formed. This was filtered off and washed with 50% ethanol and then ether and discarded. Ether treatment of the filtrate yielded an additional amount of insoluble material which was filtered off. The ether solution was then separated from the aqueous layer, dried and concentrated in vacuo. The residue was taken up in petroleum ether and chromatographed on 580 g. of neutral alumina (activity grade III; e.g., containing 6% of water). After elution of material with petroleum ether (60–70°), yellow 2-amino-3'-trifluoromethylbenzophenone could be eluted with a mixture of petroleum ether (60–70°) and ether (9:1). Crystallization from a mixture of 5 ml. of ether and 50 ml. of petroleum ether (60–70°) yielded the pure amine, melting at 97–99° C. (yellow needles).

*Example 24*

2.00 g. of 2-amino-3'-trifluoromethylbenzophenone was treated with glycine ester hydrochloride as described in Example 19 for the preparation of 8-trifluoromethyl-5-phenyl - 3H-1,4-benzodiazepin-2(1H)-one. Crystallization of the crude reaction product, using ether and benzene, gave a crude product melting between 200° and 205° C. This material was dissolved in 20 ml. of acetone, filtered through a column of 5 g. of neutral alumina (activity grade II; e.g., containing 3% of water) and then recrystallized from acetone-benzene to yield pure 5-(3-trifluoromethylphenyl) - 3H - 1,4-benzodiazepin-2-(1H)-one, melting at 204–205° C. (colorless, flat needles).

*Example 25*

A solution of p-trifluoromethyl phenyl magnesium bromide, prepared from 5.55 g. of magnesium, 50.0 g. of p-bromo-benzotrifluoride and 110 ml. of anhydrous ether, was added with stirring over a period of 3 hours at 20° C. to a solution of 33.0 g. of 2-methyl-4H-3,1-benzoxazin-4-one in 300 ml. of methylene chloride. After stirring at room temperature for an additional half hour, the reaction mixture was poured onto a mixture of 50 g. of ammonium chloride and 500 g. of ice. The mixture was left overnight at room temperature and then extracted with ether. The ether extract was concenetrated and gave a crude material, which was hydrolyzed by refluxing for one hour with a mixture of 300 ml. of ethanol and 300 ml. of 3 N sodium hydroxide. Extraction with petroleum ether (60–70°) yielded a yellow solid. Chromatography of the material soluble in petroleum ether on 200 g. of neutral alumina (activity grade II; e.g., containing 3% water) gave, on elution with petroleum ether (60–70°) and a petroleum ether (60–70°)-ether (9:1) mixture, yellow solid 2-amino-4'-trifluoromethyl-benzophenone. Crystallization from 150 ml. of hexane yielded a pure product (yellow needles). An analytical sample melted at 99–100° C.

*Example 26*

2.00 g. of 2-amino-4'-trifluoromethyl-benzophenone was treated with glycine ester hydrochloride as described in Example 19 for the preparation of 8-trifluoromethyl-5-phenyl - 3H-1,4-benzadiazopin-2(1H)-one. Crystallization of the crude reaction product from a mixture of ether and hexane yielded the crystalline 5(4-trifluoromethylphenyl) - 3H-1,4-benzodiazopin-2(1H)-one. Recrystallization from acetone-benzene gave the pure compound, melting at 219–220° C. (colorless needles).

*Example 27*

7.3 g. of 5-(2-trifluoromethylphenyl)-3H-1,4-benzodiazopin-2(1H)-one were dissolved at 0° in 58.4 ml. of concentrated sulfuric acid. To this, over a period of about 15 minutes, 3.22 g. of potassium nitrate were added with stirring. After keeping the reaction mixture for 30 minutes at 0°, it was allowed to stand for one hour at 25°. Finally, it was heated to 50° for 3 hours. After standing overnight at 25°, the yellow solution was poured over 250 g. of ice and the precipitate obtained, filtered and thoroughly washed with diluted ammonium hydroxide solution, diluted acetic acid and water. Crystallization from acetone-benzene of the thus-obtained crude product afforded the 7-nitro-5-(2'-trifluoromethylphenyl)-3H-1,4-benzodiazopin-2(1H)-one. From the mother liquor and the filtrate, a second crop could be obtained. An analytical sample was prepared by recrystallization from acetone-methanol. Slightly yellow prisms (hexagonal), melting at 233–234°, were obtained.

*Example 28*

26.5 g. of 2-amino-5-trifluoromethylbenzophenone were dissolved in 250 ml. of anhydrous ether and 7.9 ml. of pyridines. The resulting solution was stirred and cooled to 0° C. and then treated over a period of 30 minutes with a solution of 23.2 g. of bromoacetyl bromide in 50 ml. of anhydrous ether. After stirring for another half hour at 0° C., the resulting suspension was stirred for 3 hours at room temperature. Water was then added, the ether layer was separated and concentrated in vacuo. The oily residue (39.2 g.) was crystallized from a mixture of 60 ml. of benzene and 90 ml. of hexane yielding a first crop of 2-bromoacetamido-5-trifluoromethylbenzophenone in the form of needles. From the mother liquor, a second crop could be obtained. Recrystallization from benzene-hexane gave an analytical sample, melting at 103–104° C.

*Example 29*

5.0 g. of 2-bromoacetamido-5-trifluoromethylbenzophenone were dissolved in 150 ml. of anhydrous ether and added over a period of 1 hour with stirring to 50 ml. of dry, liquid ammonia. The resulting solution was stirred for 5 hours at the reflux temperature of ammonia, a Dry-Ice-acetone condenser being used. This was then replaced with a conventional water-condenser and the ammonia allowed to distill off overnight. The resulting suspension, after standing for 5 days at room temperature, was diluted with water and extracted with ether. The ether extract was concentrated in vacuo to give crude 2-aminoacetamido - 5 - trifluoromethylbenzophenone. Crystallization from 6 ml. of benzene and 15 ml. of hexane gave a pure product, melting at 97–99° C.

*Example 30*

1.00 g. of 2-aminoacetamido-5-trifluoromethylbenzophenone in 10 ml. of pyridine were refluxed for two hours. Evaporation of the solvent and crystallization of the residue from benzene-hexane gave colorless prisms of 5-phenyl - 7-trifluoromethyl-3H-1,4-benzodiazepin-2(1H)-one, melting at 205–206° C.

*Example 31*

100.0 g. of 2-chloro-5-trifluoromethylbenzonitrile were stirred and refluxed for one hour in a solution prepared from 200 g. of sodium hydroxide and 400 ml. of water. After cooling, the suspension was diluted with 2 liters of water and extracted with ether to give a neutral, red oil, which was discarded. The aqueous alkaline layer was then acidified (Congo-red) with sulfuric acid and extracted with ether. After evaporation of the ether a crude, solid material, melting at 82–83° C., was obtained. This was heated with 300 ml. of hexane to 60° C. for 10 minutes and then cooled to 0° C. After filtration on a suction funnel, 2-chloro-5-trifluoromethylbenzoic acid was obtained. Recrystallization from hexane gave an analytically pure sample; colorless plates, melting at 93–94° C.

*Example 32*

A mixture of 100 g. of 2-chloro-5-trifluoromethylbenzoic acid and 340 ml. of thionyl chloride was stirred and refluxed for 4 hours. After evaporation of the reagent in vacuo, the crude 2-chloro-5-trifluoromethylbenzoic acid chloride was fractioned in vacuo, using a 15 cm. Vigreux column, B.P. 59–61°/1 mm. (colorless liquid).

*Example 33*

First, a solution of o-trifluoromethyl phenyl magnesium bromide was prepared in the usual way using 13.5 g. of magnesium turnings, 255.0 ml. of anhydrous ether and 122.5 g. of o-bromo-benzo-trifluoride. Then, over a period of 30 mins., a solution of 120.0 g. of 2-chloro-5-trifluoromethylbenzoic acid chloride in 1 liter of benzene was added with stirring at 20° C. to the Grignard solution. After stirring for an additional 30 minutes at 20° C., a part of the solvent, e.g., all of the ether, was distilled off until the distillation temperature reached 78° C. The reaction mixture was then refluxed for 3 hours. It was left at room temperature overnight and was then poured over a mixture of 100 g. of ammonium chloride and 500 g. of ice. After standing for 1 hour, it was extracted with ether. The other layers were washed with water, 3 N sodium hydroxide and again with water. Evaporation of the solvent in vacuo after drying over sodium sulfate yielded an oil, which was purified in 2 portions by chromatography, on a total of 2.4 kg. of aluminum oxide (activity grade II). Elution with hexane (25.4 liters total) and ether-hexane-(9:1)- and (4:1)-mixture (6 liters total) yielded 2-chloro-2',5-bis-(trifluoromethyl)-benzophenone. This was recrystallized from 200 ml. of hexane. Recrystallization from hexane gave an analytically pure sample (colorless needles), melting at 49–50° C.

Example 34

A mixture consisting of 50.0 g. of 2-chloro-2',5-bis-(trifluoromethyl)-benzophenone, 300 ml. of dioxane, 300 ml. of concentrated ammonium hydroxide (58% $NH_4OH$, corresponding to 28–30% $NH_3$) and 5 g. of cuprous chloride was heated to 140° C. for 10 hours in an autoclave. The reaction mixture was extracted with ether yielding an oil. This was purified as follows: The crude reaction product was dissolved in 800 ml. of hexane, filtered through cotton into a 2 liter Erlenmeyer flask, placed in an icebath. 200 ml. of 50% (by weight) sulfuric acid were added and the mixture allowed to stir for 30 minutes. This caused a voluminous precipitation (amine sulfate) which was collected with suction on a sintered glass funnel. The solid material thus-obtained was introduced into 200 ml. of 3 N sodium hydroxide in order to generate the free amine. This was extracted with ether in the usual way; an oil was obtained, which was further purified by dissolving it in 500 ml. of hexane and filtration through 50 g. of aluminum oxide (activity grade I). The column was washed 3 times with 100 ml. of hexane each. The hexane eluates were combined, concentrated to about 80 ml. and kept overnight at 0° C. Thus, light yellow prisms of 2-amino-2',5-bis-(trifluoromethyl)-benzophenone were obtained. Recrystallization from hexane gave an analytically pure sample melting at 76–78° C.

Example 35

11.64 g. of 2-amino-2',5-bis-(trifluoromethyl)-benzophenone dissolved in 56 ml. of anhydrous ether and 2.84 ml. of pyridine, were treated at 0° C. with 3.0 ml. of bromoacetyl bromide. An immediate precipitation occurred containing the 2-bromoacetamido derivative which was not isolated. After stirring the reaction mixture first for one hour at 0° C., then for 3 hours at 25° C., 50 ml. of liquid ammonia were introduced into the reaction flask, using a Dry Ice-acetone condenser. After stirring for 3 hours at the reflux temperature of liquid ammonia, the Dry Ice condenser was replaced with a conventional condenser and the ammonia allowed to evaporate overnight. Some more ether and water was added to the residue. The other layer was separated and concentrated in vacuo. The oily residue was dissolved in a mixture of 50 ml. of benzene and 50 ml. of hexane and chromatographed on 280 g. of aluminum oxide (activity grade III). Starting material was regenerated using 3 times 300 ml. of benzene-hexane-(1:1)-mixture as an eluent. Then, with pure benzene, followed with ether, 2-aminoacetamido-2',5-bis-(trifluoromethyl)-benzophenone was eluted. Crystallization from benzene-hexane and recrystallization from benzene-hexane gave slightly yellow, cubic prisms, melting at 108–109° C.

Example 36

3.33 g. of 2-aminoacetamido-2',5-bis-(trifluoromethyl)-benzophenone were heated in an open tube to 203–205° C. for 30 minutes. At the beginning, the molten material bubbled strongly. The gas evolution had almost completely stopped after 30 minutes. Upon cooling, a glass was obtained. This was dissolved in warm benzene and chromatographed on 100 g. of aluminum (activity grade III). Elution with 300 ml. of benzene gave an oil, which was discarded. Elution with a benzene-ether mixture (1:1) yielded an oily material, which crystallized readily upon addition of a few drops of benzene. It was further purified by dissolving in ether and extraction with 1 N hydrochloric acid. The ether extract was then crystallized from a small amount of ether to give 2',5-bis-(trifluoromethyl)-1,4-benzodiazepin-2(1H)-one. An analytical sample, prepared by recrystallization from benzene-hexane, melted at 226–227° C. (colorless plates).

Example 37

11.25 g. of o-bromobenzotrifluoride was converted to the Grignard reagent in the usual way with 1.22 g. of magnesium and 200 cc. of dry ether. The solution was then added dropwise with cooling and stirring to 9.78 g. of 6-chloro-2-methyl-3,1-benzoxazin-4-one dissolved in 150 cc. of benzene and 50 cc. of ether. The resulting solution was stirred for 1 hour at room temperature, then cooled in an ice bath and the Grignard complex decomposed with 50 cc. of 10% hydrochloric acid. The organic layer was separated and dried over anhydrous potassium carbonate for 3 hours. The solvent was then distilled off and the residue treated with a solution of 7 cc. of concentrated hydrochloric acid in 40 cc. of ethanol. After refluxing for 1 hour, the solvents were distilled off and the residue treated with 20 cc. of water. A yellow solid separated. After drying, it was crystallized from hexane, yielding 2-amino-5-chloro-2'-(trifluoromethyl)benzophenone which melted at 97–99° C.

Example 38

8.9 g. of bromoacetyl bromide was added dropwise to a solution of 13.3 g. of 2-amino-5-chloro-2'-(trifluoromethyl)-benzophenone in 250 cc. of dry ether. After the addition, the solution was stirred for 1 hour and the solvent removed. The residue was crystallized from heptane, yielding 5-chloro-2-bromoacetamido-2'-(trifluoromethyl)benzophenone melting at 139–141° C.

Example 39

4.2 g. of 5-chloro-2-bromoacetamide-2'-(trifluoromethyl)-benzophenone was added to 100 cc. of liquid ammonia containing 50 cc. of ether. The mixture was stirred overnight during which time the ammonia evaporated. Water was added to the residue and the solid filtered. The product, 5-chloro-2-glycylamino-2'-(trifluoromethyl)benzophenone, was crystallized from alcohol and melted at 114–116° C.

Example 40

2.4 g. of 5-chloro-2-glycylamino-2'-(trifluoromethyl)-benzophenone was dissolved in 15 cc. of pyridine and the solution refluxed for 10 hours. The pyridine was distilled off and the residue was repeatedly crystallized from heptanebenzene and the product, 7-chloro-5-(2-trifluoromethyl-phenyl)-3H-1,4-benzodiazepin-2(1H)-one, melted at 190–192° C.

Example 41

4.97 g. of 7-nitro-5-(2-trifluoromethyl-phenyl)-3H-1,4-benzodiazepin-2(1H)-one was dissolved in a cold solution of sodium methoxide obtained from 350 mg. of sodium and 50 ml. of anhydrous methanol. The solution was stirred at room temperature for 30 minutes after which 5 ml. of methyl iodide was added and stirring continued for 3 hours. The solution was then permitted to stand at −15° for several hours during which time a crystalline precipitate formed. The precipitate was filtered off, washed with water and with ether, and crystallized from acetone to yield 1-methyl-7-nitro-5-(2-trifluoromethyl-phenyl)-3H-1,4-benzodiazepin-2(1H)-one as almost colorless prisms melting at 198–199° C.

Example 42

20.0 g. of 2-chloro-5-trifluoromethylbenzophenone were dissolved in 300 ml. of a saturated (at 20°) methylamine solution in methanol. 10.0 g. of cuprous chloride were added and the resulting mixture heated to 140° for a period of 10 hours in an autoclave. The resulting reaction mixture was concentrated in vacuo to about 100 ml. diluted with water, and extracted with ether. The ether extract yielded after concentration 18.4 g. of an oil which was dissolved in hexane and purified by chromatography on 400 g. of alumina (Woelm, grade III). The elution was carried out first with four 400 ml. fractions of hexane. The next three fractions (400 ml. each) were obtained using a hexane-ether mixture (9:1) as the eluant.

Fraction (1) of the chromatogram, upon crystallization from ether-hexane, gave α,α,α-trifluoro-N-methyl-2-(α-methyliminobenzyl)-p-toluidine as long colorless needles, melting at 100–101°.

Fractions (6) and (7) of the chromatogram, upon crystallization from 5 ml. of hexane gave α,α,α- trifluoro-N-methyl-2-(α-methyliminobenzyl)-p-toluidine as colorless prisms melting at 120–122°.

The two samples of α,α,α-trifluoro-N-methyl-2-(α-methyliminobenzyl)-2-toluidine, with differing melting points, obtained above from fractions (1) and (6) and (7) of the chromatogram, represent isomers of the same compound.

Example 43

500 mg. of each of the isomers of α,α,α-trifluoro-N-methyl-2-(α-methyliminobenzyl)-p-toluidine in 10 ml. of toluene was treated with 2.5 ml. of water and 2.5 g. of concentrated sulfuric acid. The reaction mixture was extracted with ether and washed with water and 3 N NaOH solution. Evaporation of the solvent followed by crystallization from petroleum ether yielded 2-methylamino-5-trifluoromethylbenzophenone, melting at 74–75° (yellow needles).

Example 44

A mixture, consisting of 50.0 g. of 2-chloro-5-trifluoromethylbenzophenone, 10.0 g. of cuprous chloride and 500 ml. of a saturated solution of methylamine in methanol was heated to 140° for 10 hours in an autoclave. The mixture was concentrated, diluted with water and extracted with ether. The ether extract yielded after concentration 45.0 g. of crude reaction product, which partially solidified. Crystallization from 150 ml. of hexane gave a first crop. From the mother liquors, two more crops were obtained.

For the purpose of hydrolysis, these 3 fractions were combined and refluxed for 15 minutes with vigorous stirring in a mixture of 260 ml. of toluene, 120 ml. of water and 120 g. of concentrated sulfuric acid. After cooling, the two layers were separated, the acid layer then being extracted with hexane. The toluene layer and the hexane extract were combined, washed 3 times with 3 N NaOH solution and dried over sodium sulfate. Evaporation of the solution in vacuo, followed by crystallization of the residue from 200 ml. of petroleum ether at 0°, yielded 2-methylamino-5-trifluoromethylbenzophenone melting at 74–75°.

Example 45

3.5 g. of 7-nitro-5-(2-trifluoromethylphenyl)-3H-1,4-benzodiazepin-2(1H)-one was suspended in 50 ml. of methanol and hydrogenated at room temperature and normal pressure, using Raney nickel as a catalyst. Approximately 750 ml. of hydrogen was consumed in about 2 hours. The resulting solution was filtered free of the catalyst and the filtrate concentrated to a volume of about 20 ml. Upon cooling, the solid reaction product, 7-amino - 5 - (2 - trifluoromethylphenyl) - 3H - 1,4 - benzodiazepin-2(1H)-one, was obtained. The material was dimorphic and had melting points at 221–222°, and after crystallization from benzene, at 197–198°.

Example 46

1 g. of 1-methyl-7-nitro-5-(2-trifluoromethylphenyl)-3H-1,4-benzodiazepin-2(1H)-one was hydrolyzed by refluxing it for 2 hours in a mixture consisting of 5 ml. of concentrated hydrochloric acid, 5 ml. of water and 10 ml. of ethanol. Extraction with ether and petroleum ether gave a solid product. The mother liquor was concentrated in vacuo, a yellow oil obtained, and said oil purified by chromatography, using 15 g. of alumina ("Giulini," activity grade III). Elution with petroleum ether-benzene mixtures, 9:1 and 4:1, yielded crude reaction product, 2-methylamino-5-nitro-2'-trifluoromethylbenzophenone, as a yellow oil. The oil was crystallized in ether-petroleum ether to yield pale yellow prisms which melted at 118–119°.

Example 47

To a stirred solution of 19 g. of 2-amino-2'-trifluoromethyl-benzophenone in 200 cc. of acetic acid cooled in an ice bath to about 10°, a solution of 11.46 g. of bromine in 75 cc. of acetic acid was added dropwise over a period of ten minutes. After the addition had been completed the mixture was allowed to stir for an additional five minutes at 10° and then the cooling bath was removed and the reaction mixture allowed to reach room temperature over a period of 20 minutes. A white hydrobromide salt precipitated and was filtered off, washed with 100 cc. of ether, dissolved in water and made alkaline with ammonium hydroxide. The product was then extracted with methylene chloride (3 x 50 cc.). The organic layers were combined, dried over anhydrous sodium sulfate, filtered and the solvent removed to give 2-amino-5-bromo-2'-trifluoromethyl-benzophenone which upon recrystallization from ethanol formed yellow needles melting at 93–94°. A further crop of product was obtained by extracting the acetic acid filtrate with methylene chloride (4 x 50 cc.), washing the combined extracts with ammonium hydroxide (2 x 50 cc.), water (3 x 50 cc.), drying over anhydrous sodium sulfate, filtering, removal of the solvent and recrystallization of the residue from ethanol.

The same product could also be obtained by converting 35 g. of o-chlorobenzotrifluoride to the Grignard reagent in the usual way with 4.63 g. of magnesium and 30 cc. of dry tetrahydrofuran. The solution was diluted with 30 cc. of tetrahydrofuran and then added dropwise under nitrogen with cooling and stirring to 30 g. of 6-bromo-2-methyl-4H-3,1-benzoxazin-4-one dissolved in 200 cc. of dry toluene. The resulting solution was stirred for 1 hour at room temperature, then refluxed for 1 hour, cooled in an ice bath and the Grignard complex decomposed with 36 cc. of 5 N hydrochloric acid. The mixture was then diluted with ether, washed with water, and then with aqueous ammonia. The organic layer was separated, concentrated in vacuo and the residue refluxed for 1 hour with a mixture of 50 cc. of concentrated hydrochloric acid in 50 cc. of ethanol. Then the solvents were distilled off and the residue treated with 20 cc. of water whereupon a solid separated. After drying, it was crystallized from hexane yielding 2-amino-5-bromo-2'-trifluoromethyl-benzophenone melting at 92–94°.

A solution of 21.9 g. of 2-amino-5-bromo-2'-trifluoromethyl-benzophenone was dissolved in 250 cc. of ether and treated with 13.8 g. of bromoacetyl bromide. After the addition, the mixture was stirred for 1 hour and the solvent removed. The residue was crystallized from methanol yielding 5-bromo-2-bromoacetamido-2'-trifluoromethyl-benzophenone as white prisms melting at 140.5–141.5°.

26.4 g. of 5-bromo-2-bromoacetamido-2'-trifluoromethylbenzophenone was added to 750 cc. of liquid ammonia and the mixture was warmed gently on the steam bath to facilitate evaporation of the ammonia. The residue was then partitioned between 200 cc. of methylene chloride and 300 cc. of water. The layers were separated and the organic layer washed with water (3 x 50 cc.), saturated brine (3 x 25 cc.), dried over anhydrous sodium sulfate, filtered, and evaporated to dryness. Recrystallization of the residue from acetone gave 5-bromo-2-aminoacetamido-2'-trifluoromethyl-benzophenone, as a crystalline material, and an oily residue. The crude amino-acetamido compound was not further purified but was recombined with the residue, dissolved in a mixture of 1200 cc. of pyridine and 100 cc. of benzene, and refluxed using a fractionating column equipped with a Dean-Stark head. Water, formed in the cyclization, was removed by azeotropic distillation. After the thoretical amount of water had been collected (36 hours), the pyridine-benzene solution was evaporated under reduced pressure to yield 7-bromo-5-($\alpha,\alpha,\alpha$-trifluoro-orthotolyl)-3H-1,4-benzodiazepin-2(1H)-one, which upon recrystallization from acetone/hexane formed white prisms melting at 183–185°.

The 5-bromo-2-aminoacetamido-2'-trifluoromethyl-benzophenone mentioned above is not a part of this invention but its preparation is disclosed above in order that the present disclosure may be complete.

*Example 48*

A solution of 26.5 g. of 7-trifluoromethyl-4,5-dihydro-5-phenyl-3H-1,4-benzodiazepin-2(1H)-one in 100 ml. of N,N-dimethyl-formamide was stirred and refluxed for 1 hour with 5.14 g. of sodium methoxide (added in the form of a methanolic solution containing 4.35 m. moles of sodium methoxide per cc. of solution). The sodio derivative thus formed was treated with 123 g. of methyl iodide and the solution refluxed for a further 2 hours. After the excess methyl iodide had been distilled off the reaction mixture was poured into 1,000 ml. of water and extracted four times with 150 ml. portions of methylene chloride. The extracts were combined, treated with decolorizing carbon, dried over anhydrous sodium sulfate and filtered. Removal of the solvent and recrystallization of the residue from hexane gave 7-trifluoromethyl-1,4-dimethyl-4,5-dihydro-5-phenyl-3H-1,4-benzodiazepin-2(1H)-one as white needles melting at 77–79°.

*Example 49*

5 - (2 - trifluoromethylphenyl)-3H-1,4-benzodiazepin-2(1H)-one (60.8 gm.) was added at 20° to a solution of sodium methoxide, prepared from sodium (5.06 gm., 0.22 gram-atoms) and anhydrous methanol (500 ml.). The mixture was stirred for 15 minutes at room temperature, during which time all the solids dissolved. Methyl iodide (40 ml.) was then added dropwise to the stirred solution during 20 minutes and stirring was continued for a further 3 hours at room temperature. The solution was concentrated in vacuo at 25° and water (900 ml.) added to the residue. The mixture containing the resulting precipitate was extracted with methylene chloride. The extract was washed with water, dried over anhydrous magnesium sulfate and evaporated, to give the crude product as a green gum which rapidly crystallized. Recrystallization from ethanol-water, with addition of decolorizing carbon, gave blue crystals. Decolorization of the product was readily effected by dissolving it in methylene chloride and filtering the resulting solution through a short column of "Woelm" neutral alumina, activity V (400 gm.). Evaporation of the eluates and recrystallization of the resulting residue from aqueous ethanol, with addition of decolorizing carbon, gave 1-methyl-5-(2-trifluoromethylphenyl)-3H-1,4-benzodiazepin-2(1H)-one as very pale yellow crystals, melting at 137–138°. Further crops obtained from the mother-liquors were purified by the above method and upon recrystallization from aqueous ethanol yielded colorless rhombs, melting at 135–137°.

*Example 50*

5.3 g. of 2-amino-5-trifluoromethylbenzophenone was dissolved in 25 ml. of anhydrous ether and 1.60 ml. of pyridine. The resulting solution was cooled to 0° and treated with a solution of 1.70 ml. of chloroacetyl chloride in 10 ml. of anhydrous ether whereupon a voluminous precipitation occurred. After stirring for 1 hour at 0° and one hour at 25° the reaction mixture was diluted with water, the ether layer separated, and concentrated in vacuo. The residue was crystallized from a mixture of ether and hexane yielding 2-chloro-2'-benzoyl-4'-trifluoromethyl-acetanilide as needles melting at 115–116°.

*Example 51*

A solution of 2.1 g. of 7-nitro-5-($\alpha,\alpha,\alpha$-trifluoro-o-tolyl)-3H-1,4-benzodiazepin-2(1H)-one in a mixture of 35 ml. of ethanol and 35 ml. of 3 N hydrochloric acid was refluxed for 13 hours. The reaction mixture was left at room temperature for 48 hours and the crystalline product filtered off. Upon being recrystallized from ether, the product 2-amino-5-nitro-2'-trifluoromethylbenzophenone formed yellow rhombic plates melting at 164–5°.

We claim:

1. A compound selected from the group consisting of those of the formula

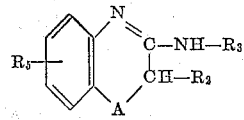

wherein A represents a carbon nitrogen grouping which completes the seven-membered diazepine ring and which is selected from the group consisting of

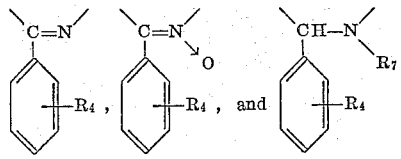

$R_2$, $R_3$ and $R_7$ each represent a member of the group consisting of hydrogen and lower alkyl; $R_4$ and $R_5$ are chosen from the group consisting of hydrogen, halogen, nitro, amino and trifluoromethyl and at least one of $R_4$ and $R_5$ is trifluoromethyl; and salts thereof.

2. 7 - trifluoromethyl-2-amino-5-phenyl-3H-1,4-benzodiazepine 4-oxide.

3. 7-trifluoromethyl-2-lower alkylamino-5-phenyl-3H-1,4-benzodiazepine 4-oxide.

4. 7 - trifluoromethyl-2-methylamino-5-phenyl-3H-1,4-benzodiazepine 4-oxide.

5. 8 - trifluoromethyl-2-amino-5-phenyl-3H-1,4-benzodiazepine 4-oxide.

6. 8-trifluoromethyl-2-lower alkylamino-5-phenyl-3H-1,4-benzodiazepine 4-oxide.

References Cited by the Examiner

UNITED STATES PATENTS 2,893,992   7/60   Sternbach _____ 260—239

OTHER REFERENCES

Culvenor: Reviews of Pure and Applied Chemistry, vol. 3, No. 2, 1953, pp. 83–109.

Yale: Jour. of Med. and Pharm. Chem., vol. 1, No. 2 (1959), pp. 121–33.

NICHOLAS S. RIZZO, *Primary Examiner.*

WALTER A. MODANCE, *Examiner.*

UNITED STATES PATENT OFFICE
CERTIFICATE OF CORRECTION

Patent No. 3,182,054                                   May 4, 1965

Leo Henryk Sternbach et al.

It is hereby certified that error appears in the above numbered patent requiring correction and that the said Letters Patent should read as corrected below.

Column 4, line 17, for "II and II" read -- II and III --; line 28, for "$R_7$ lower" read -- $R_7$ is lower --; column 9, line 48, for "2(H)" read -- 2(1H) --; column 12, line 1, for "pyridines" read -- pyridine --; column 13, lines 3 and 57, for "other", each occurrence, read -- ether --; same column 13, line 26, for "flank" read -- flask --.

Signed and sealed this 3rd day of August 1965.

(SEAL)
Attest:

ERNEST W. SWIDER                                EDWARD J. BRENNER
Attesting Officer                                    Commissioner of Patents